United States Patent
Walczyk et al.

(10) Patent No.: US 7,493,810 B2
(45) Date of Patent: Feb. 24, 2009

(54) DEVICE FOR MECHANICAL WEIGHT BEARING INDICATION WITH LOAD RANGE CAPABILITY

(75) Inventors: Daniel F. Walczyk, Brunswick, NY (US); Stephen Bornhoft, Wallkill, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 173 days.

(21) Appl. No.: 11/465,641

(22) Filed: Aug. 18, 2006

(65) Prior Publication Data

US 2008/0041169 A1    Feb. 21, 2008

(51) Int. Cl.
G01L 1/04 (2006.01)
G01L 1/06 (2006.01)
A61B 5/00 (2006.01)

(52) U.S. Cl. .................. 73/172; 73/862.451; 73/862.53; 200/1 B

(58) Field of Classification Search ............ 73/862.381, 73/172, 862.53, 862.451; 200/1 B
See application file for complete search history.

(56) References Cited

U.S. PATENT DOCUMENTS

| | | | | |
|---|---|---|---|---|
| 5,315,204 A | * | 5/1994 | Park .......................... | 200/181 |
| 5,559,311 A | * | 9/1996 | Gorbatoff ................... | 200/1 B |
| 5,717,176 A | * | 2/1998 | Dahlstrom .................. | 200/1 B |
| 6,405,606 B1 | * | 6/2002 | Walczyk et al. ......... | 73/862.381 |
| 6,603,086 B2 | * | 8/2003 | Kawaguchi et al. ......... | 200/1 B |
| 6,639,159 B2 | * | 10/2003 | Anzai ......................... | 200/1 B |
| 6,747,218 B2 | * | 6/2004 | Huseman et al. ............ | 200/1 B |
| 6,794,589 B2 | * | 9/2004 | Kubat et al. ................. | 200/6 A |
| 6,995,324 B2 | * | 2/2006 | Asada ......................... | 200/1 B |
| 7,166,813 B2 | * | 1/2007 | Soma et al. ................. | 200/600 |
| 7,402,764 B2 | * | 7/2008 | Pihlaja et al. ............... | 200/5 R |
| 2002/0093428 A1 | * | 7/2002 | Bechmann ............... | 340/573.1 |
| 2007/0246335 A1 | * | 10/2007 | Sharrah et al. ............. | 200/1 B |

* cited by examiner

*Primary Examiner*—Harshad Patel
*Assistant Examiner*—Jonathan Dunlap
(74) *Attorney, Agent, or Firm*—Notaro & Michalos P.C.

(57) ABSTRACT

A mechanical load bearing indicator producing signals to a user when the user applies more than selected amounts of load between an extremity of the use and a surface. The indicator has a base plate adapted to establish a frame of reference with the surface, a load plate mounted for movement toward and away from the base plate and adapted to receive loads from the user's extremity, and at least two snap domes mechanically engaged between the base plate and the load plate for generating two signals when more than two different respective loads are applied to the load plate by the extremity. The domes are either in series between the plates or are together in a dual dome containing both, or are one or more stacks of domes which individually collapse under incremental loads which are added together to form the selected lower and higher loads.

10 Claims, 5 Drawing Sheets

DEVICE FOR MECHANICAL WEIGHT BEARING INDICATION WITH LOAD RANGE CAPABILITY

FIELD AND BACKGROUND OF THE INVENTION

The present invention relates, in general, to force indicators for medical or biological uses, and in particular, to a new and useful weight bearing indicator which is purely mechanical yet provides an unambiguous message, both tactile and audible, to a person wearing the indicator when two different amounts of force between the person's foot and the ground have been exceeded.

Following orthopedic surgery or injury to the lower extremities, patients are encouraged to gradually bear weight on their limb, but are warned not to exert more than a certain limited amount of force on the injured extremity.

As a result, most patients do not apply any weight or apply insufficient weight to the injured lower extremity in fear of causing further damage or pain. The application of weight is necessary, however, for proper recovery and not applying any weight is almost as detrimental as applying too much weight. A survey was conducted at Albany Medical College (Albany, N.Y.) involving over 100 patients. The patients indicated that often no weight was applied to the injured foot. Furthermore, a pilot clinical study was conducted on twenty bunionectomy patients who were given surgical sandals equipped with weight bearing indicator based on U.S. Pat. No. 6,405,606 (which will be discussed in greater detail later in this disclosure) and told to partial weight bear for a period of six weeks. Over two thirds of the patients that responded indicated that the device was useful for their recovery. Also see Walczyk, D. F., Bartlet, J. P., "An Inexpensive Weight Bearing Indicator Used for Rehabilitation of Patients with Lower Extremity Injuries," *Journal of Medical Devices*, 2006.

Electronic devices are known which sense the force applied to a foot and provide a signal to the wearer. See, for example, U.S. Pat. No. 5,408,873 which discloses a foot force sensor and U.S. Pat. No. 5,357,696 which discloses a device for measuring force applied to a wearer's foot.

Additional relevant patents, are listed by patent number and title as follows:

| Pat. No. | Title of Invention |
|---|---|
| 6,122,846 | Force Monitoring Shoe |
| 6,031,463 | Load Signaling Device for a Patient's Foot |
| 5,619,186 | Foot Weight Alarm |
| 5,323,650 | System for Continuously Measuring Forces Applied to the Foot |
| 5,269,081 | Force Monitoring Shoe |
| 5,253,654 | Orthopedic Weight Monitor |
| 4,858,620 | Warning System for Excessive Orthopedic Pressures |
| 4,814,661 | Systems for Measurement and Analysis of Forces Exerted During Human Locomotion |
| 4,745,930 | Force Sensing Insole for Electro-Goniometer |
| 4,647,918 | Multi-event Notification System for Monitoring Critical Pressure Points on Persons with Diminished Sensation of the Foot |
| 3,974,491 | Load Signaling Device for a Patient's Foot |
| 3,791,375 | Device for Sensing and Warning of Excessive Ambulation Force |
| 3,702,999 | Partial Weight Bear Warning Device. |

An electronic weight bearing alarm contained within a surgical shoe is also available under the trademark PEDA-LERT from Planet, LLC (Madison, Wis.). This device monitors the amount of weight a patient places on his or her lower limb through an advanced membrane sensor. An audible beep warning is generated when the weight limit is exceeded. A similar electronic device that can be placed in a patient's shoe is available under the trademark SANOSTEPPER from Sanostep, GmbH or Tauting, Germany.

Two patents of particular relevance since they use simple mechanical snap members to signal the wearer of the device and require no power and no complex mechanism, are U.S. Pat. No. 6,405,606, issued to one of the co-inventors of the present application (Walczyk) and another inventor in 2002 for Mechanical Weight Bearing Indicator for the Foot, and U.S. Pat. No. 6,752,028, issued in 2004 for Load Monitoring Test Device for a Patient's Foot. U.S. Pat. No. 6,405,606 is incorporated here by reference.

Neither of these patents disclose or suggest how, without power or complex mechanisms, two separate signals can be issued to the person wearing the device, which correspond to two different loads.

The need remains for a simple mechanical device which produces unmistakable feedback signals for a patient when two different loads are being applied to the patient's foot, so that the patient can be taught to exert a minimum desirable load on the foot during each step, but to avoid exerting more than a maximum desirable load.

SUMMARY OF THE INVENTION

An object of the present invention is to provide a simple mechanical device which produces at least two separate tactile and audible feedback signals for a person or patient who wears the device in his or her shoe, sandal, boot, or other medical appliance for the foot (collectively referred to here as footwear), corresponding to two different loads applied to the persons foot during each step.

The device of the present invention resets automatically when the load is removed and requires no power source. Accordingly, there are no batteries to run down and no recharging required to maintain the usefulness of the invention for long periods of time.

A patient recovering from lower extremity injuries, surgery or other conditions such as orthopedic patients, neurological patients (e.g., stroke victims), athletes and the like, simply inserts the device of the present invention into his or her footwear, or wears footwear containing the device of the present invention, and walks in a normal fashion or as prescribed by a medical professional. The present invention can also be incorporated into an orthotic device or cast worn by the patient on their foot. Any such foot covering structure is also considered to be footwear for the purpose of this disclosure.

The invention is a purely mechanical device which reacts to a first amount of weight or load being applied through it, that is, between the bottom of the patient's foot and the ground, and indicates to the patient when a first level of load has been achieved. The patient is encouraged to step firmly enough to generate this first signal for faster healing of the injury, and since this amount of load has been authorized by the patient's medical professional, the patient is less afraid of further injury by taking such a firm step.

To avoid further injury, however, a second signal is generated if the person applies more that a maximum desired load to the foot during each step. This second signal, also generated without external electrical power and automatically reset after each step, corresponds to a pre-selected value, e.g., the maximum weight permitted at the particular stage of the patient's recovery.

All embodiments of the invention are reusable and automatically reset. In this way, the patient is provided with ongoing feedback on the amount of force he or she may apply to the injured area.

According to the invention, the device can be configured to provide indications at different minimum and maximum loads so that the patient can be permitted to exert higher force as the healing process continues.

Since the device is purely mechanical, there is no threat of electrical shock to the patient. Furthermore, a mechanical design is inherently more robust and inexpensive to manufacture, as compared to an electronic device such as the PEDA-LERT device.

Another advantage of the invention is that the feedback signal, including the audible sound, is perceptible, generally only by the patient so that less attention is drawn to the patient or the patient's condition as compared to other devices.

In addition to its therapeutic value, the present invention is also a simple device for use in athletics, physical therapy, gait analysis and the like, wherever a set force limit is desirable or not desirable for applying between a part of the body and another surface.

Accordingly an object of the present invention is to provide a purely mechanical load bearing indicator for producing signals to a user when the user applies more than selected amounts of load between an extremity being used and a surface, comprising a base plate adapted to establish a frame of reference with the surface, a load plate mounted for movement toward and away from the base plate and adapted to receive loads from the user's extremity, and at least two snap domes mechanically engaged between the base plate and the load plate for generating two signals when more than two different respective loads are applied to the load plate by the extremity.

Another object of the invention is to provide the domes in series or as a dual dome containing both, as one or more stacks of domes which individually collapse under incremental loads which are added together to form the selected lower and higher loads. Another object of the present invention is to provide a mechanical weight bearing indicator which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
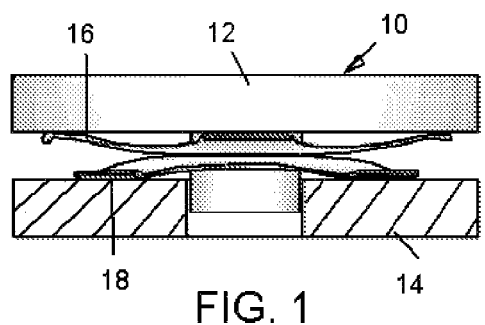
FIG. 1 is a side elevational view that is partly in section of a first embodiment of the mechanical weight bearing indicator of the present invention.
Figure 3:
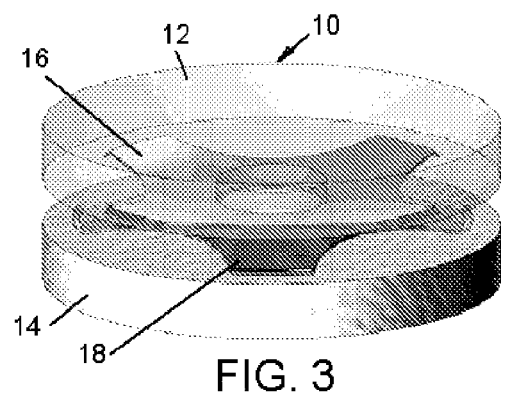
FIG. 3 is a perspective view of the embodiment of FIG. 1 with an upper load transfer partly transparent to reveal the snap dome structure.
Figure 2:
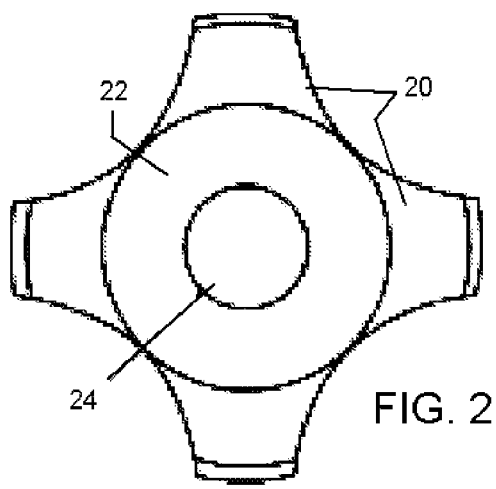
FIG. 2 is a top plan view of a snap dome that can be used in many of the embodiments on the invention, including the embodiment of FIG. 1.

Referring to the drawings in particular, the invention embodied in FIGS. 1, 2 and 3 comprises a purely mechanical weight bearing indicator generally designated 10, having a load transfer plate and base plate that sandwiches two snap domes 16 and 18 of different buckling loads in a back-to-back arrangement, that is with the large diameter bases of the domes, facing away from each other. One snap dome buckles at the lower load of a limb load range prescribed by a medical professional (e.g., an orthopedist), for example 40 lbs., while the other snap dome buckles at the higher or maximum load, e.g. 100 lbs. In this arrangement, the lower load dome 18 will buckle first when the total load through the stack exceeds 40 lbs., followed by the large dome 16 buckling when the total load exceeds 100 lbs. In normal operation, the patient will hear and feel a high-pitched click from the lower load dome buckling every time they exceed 40 lbs. For correct rehabilitation, the patient should hear and feel this every time they step on the injured limb. However, they will hear and feel a louder click from the upper load dome buckling every time they exceed 100 lbs. This indicates that the patient has put too much load on the limb.

The choice of snap dome(s) buckling load for the upper and lower load limits is critical to the operation of this invention. In general, the upper load snap dome(s) must buckle at a load greater than the lower load snap dome(s). For example, if the lower load is 20 lbs, then a single or stack of domes would be chosen appropriately to buckle at this load. Then, the upper single or stack of domes for the upper load must be chosen so as to buckle at a load greater than 20 lbs; say 50 lbs for this example. Once buckled, snap domes take very little force to keep in this buckled state. Therefore, the lower load single or stack of domes will remain buckled if the limb load exceeds the upper load limit, 50 lbs in this case, while the upper load single or stack of domes buckles also. The load limb range would approximately be 20 lbs (i.e. lower load dome(s) buckling) to 50 lbs (i.e. upper load dome(s) buckling).

FIG. 2 is a non-limiting example of a metal snap dome that is commercially available in a wide variety of sizes and load specifications. If has four curved lobes 20 formed as one piece with a central concave area 22 having a hole 24 through its center.

Such snap domes are available, for example from, Snaptron Inc. of 960 Diamond Valley Drive, Windsor, Colo. 80550. While these domes are used primarily in switches, the person of ordinary skill in the art of the present invention can utilize their service to provide snap domes for use with the present invention. Snaptron Inc. maintains a website at URL: http://www.snaptron.com/f_series.cfm. A wide variety of snap domes in various designs and loads are available from this company.

Figure 4:
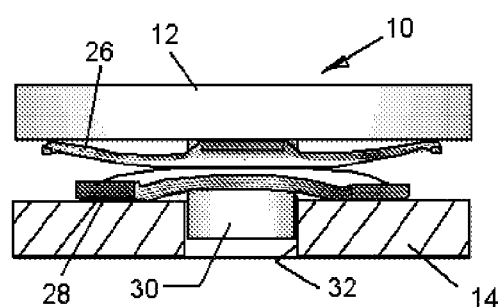
FIG. 4 is a view similar to that of FIG. 1, but of a second embodiment of the invention.
Figure 5:
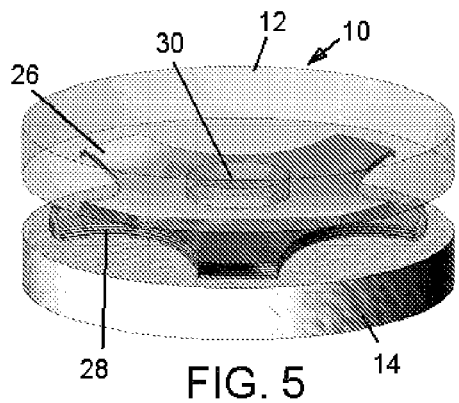
FIG. 5 is a view similar to FIG. 3 but of the second embodiment.
Figure 6:
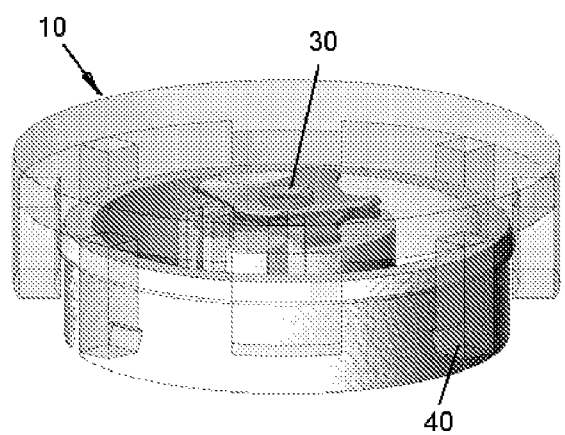
FIG. 6 is a view similar to FIG. 5 but with additional features according to a third embodiment of the invention.

When a snap dome with lobes (see FIG. 2) is used in a stack for the upper and/or lower load, the lobes must be aligned with each other as shown at 28 in FIGS. 4 and 5 for the stack to work properly. Furthermore, for the embodiments shown in FIGS. 1, 3, 4 and 5, the lobes of the upper and the lower snap domes (or stacks) should be offset with respect to each other, for optimal performance of the device. Or else the lobes will interfere with each other due to their collision preventing the apex of the snap dome from reaching the neutral plane coincident with the lobes of the same snap dome, if a plate is placed between the two individual or stacked domes, the bent ends of the domes will provide interference of a similar fashion. Ideally, they are offset by half the angle between adjacent lobes. For example, adjacent lobes on a four-lobe snap dome as shown in FIG. 2 are 90° apart; therefore, the lobes of the upper and the low snap domes (or stacks) should be offset by 45° as shown in FIGS. 3, 5 and 6.

Figure 7:
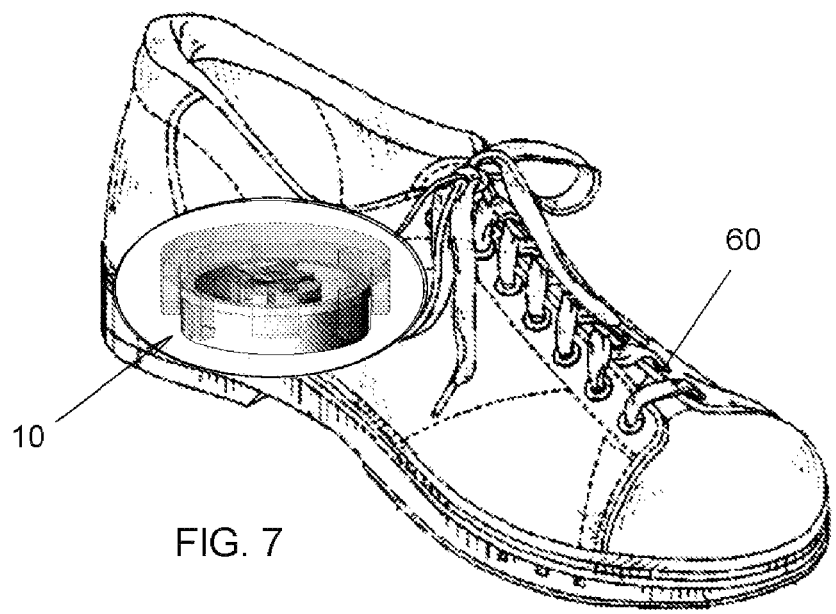
FIG. 7 is a perspective view of footwear it a portion cut away to reveal the mechanical weight bearing indicator of FIG. 6 in combination with the footwear.

In practice, the mechanism of the present invention is meant to be placed inside a shoe or orthotic, e.g. in the heel area as shown in FIG. 7, so that the upper plate 12 may or may not come into direct contact with the wearer's heel or other area of the foot and the lower plate 14 will not come into direct contact with the ground. The forces, however, from the foot to the ground are transmitted primarily through the device.

Each snap dome 16 and 18 is preferably a thin dome-shaped disk of spring metal (e.g. stainless steel) or plastic which is shown in its stable condition in FIGS. 1 and 3, and, when receiving more than its design load, will snap-through to an unstable compressed condition. The domes operate in the same way as the bottom of an oil-can or lid of a canning jar. If sufficient downward force is exerted, the snap dome will snap or buckle into its unstable position shown, becoming now nearly flat. If the force is removed, a restoring internal force, from a build-up of internal material strains similar to a compressed spring, will cause the dome to return to its upwardly dome-shaped position of FIGS. 1 and 3. The upper plate 12 lower plate 14 are made of any suitable material, for example, hard ABS plastic, metal or the like.

Plates 12,14 are approximately 3 to 5 cm in diameter to fit comfortably in a patient's shoe or medical appliance. Varying thicknesses, material and geometry (i.e., radius of curvature, height, diameter) of each dome 16 and 18 can be selected so that they collapse or buckle to their unstable conditions under different, but specifically selected, forces corresponding to minimum and maximum weights or load desired for the user's heel. The material of each dome may be any spring-like metal such as steel or other metal alloy, having high tensile strength, or may be plastic capable of having the stable and unstable positions, such as nylon. The overall height of the device 10 should be approximately 0.6 to 1.2 cm so that it can be received in the shoe, medical appliance, or orthotic without obstruction.

As noted above, no power source is needed and the invention automatically resets once the load has been removed.

A second embodiment of the invention is illustrated in FIGS. 4 and 5 where rather than two single snap domes 16 and 18, at least one of the domes or both of them are replaced by one or two stacks 26 and 28 of at least two snap disks for each dome. A stack of identical domes buckles at the combined buckling loads of the individual domes. Instead of the medical professional having to stock an assortment of domes or disks depending on the load range required for their patient, they would only stock one load disk of, for example 10 or 20 lbs. If the desired minimum load range were 40 to 100 lbs, as before, the medical professional would stack two 20-lb disks (40 lbs total) concave up under the upper transfer plate 12, and five more 20-lb disks (100 lbs total) concave down on the base plate 14.The stack 26 of two snap domes would be the first to buckle when the limb load exceeds 40 lbs, followed by the stack 28 of five snap domes buckling when the limb load rises to reach 100 lbs. The stick domes can also be pre-packaged depending upon patients weight range.

A third embodiment of the invention is illustrated in FIG. 6.

It is noted that in a preferred form of the invention as shown in all of FIGS. 1, 3, 4, 5 and 6, the load transfer plate 12 has a center post 30 rigidly attached to the upper plate 14 (shown) or the upper plate 12 to retain the lateral positions of both dome stacks. All snap domes in these embodiments will have the central hole 24 (see FIG. 2). This post 30 rides in a hole 32 provided in the base plate 14 as the plates are force toward each other during each step the user takes. The load transfer plate 12 will also be covered with a low-durometer foam or polymeric gel material, if needed.

Assembly of all the components is facilitated by a snap fit between the load transfer plate 12 which, as shown in FIG. 6 has multiple, e.g. four, retaining legs 40 that are evenly spaced around the plate 12 and embrace the base plate 14. Four support tabs guide the load transfer plate.

FIG. 7 shows the embodiment of FIG. 6 installed in the heel of a shoe 60 but it will be understood that any embodiment of the invention as illustrated here or to be developed in the future can be installed in any part of footwear to be used with the present invention.

Figure 8:
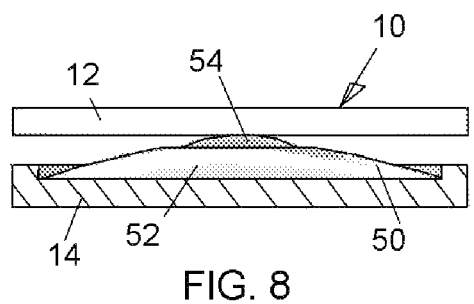
FIG. 8 is a side elevational view, partly in section of a fourth embodiment of the invention.
Figure 9:
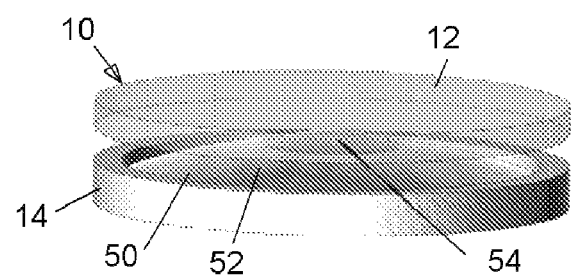
FIG. 9 is a perspective view thereof.

A fourth embodiment of the invention is illustrated in FIGS. 8 and 9 and uses low and high load domes 54 and 52 respectively, that are integrated into a single component 50 shown in the un-loaded position in FIG. 8. This dual snap dome is custom manufactured and includes a large diameter dome 52 that is in contact with the base plate 14, and a smaller snap dome 54 whose apex is in contact with the load transfer plate 10. When the lower desired load is reached, part 54 will buckle signaling the wearer via an audible click and a tactile sensation under the foot. When the upper desired load is reached, part 52 will buckle with the smaller diameter part 54 still in its compressed condition and, again, signaling the wearer with a lower-pitched audible click and tactile sensation under the foot.

Figure 10:
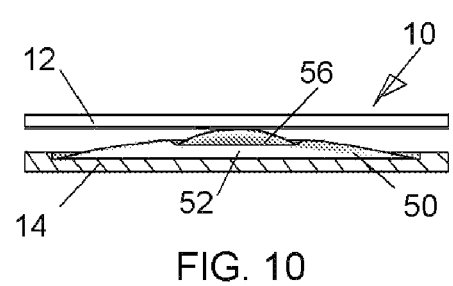
FIG. 10 is a view similar to FIG. 8 but of a fifth embodiment of the invention.
Figure 11:
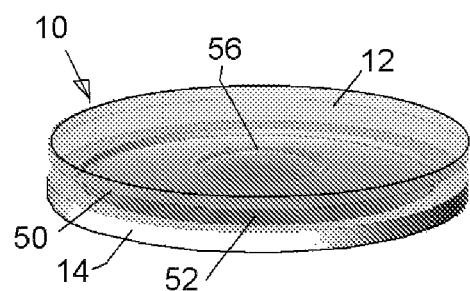
FIG. 11 is a view similar to FIG. 9 but of the fifth embodiment.
Figure 12:
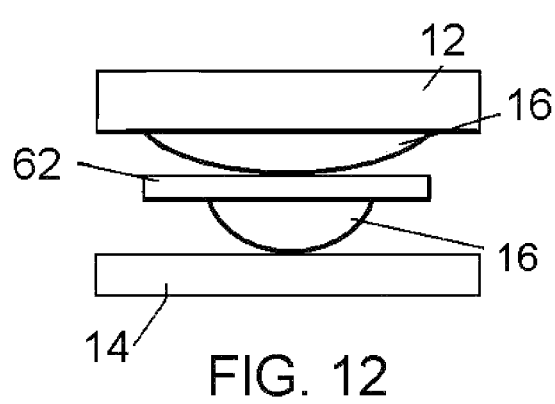
FIG. 12 is a schematic side view of a sixth embodiment of the invention.
Figure 13:
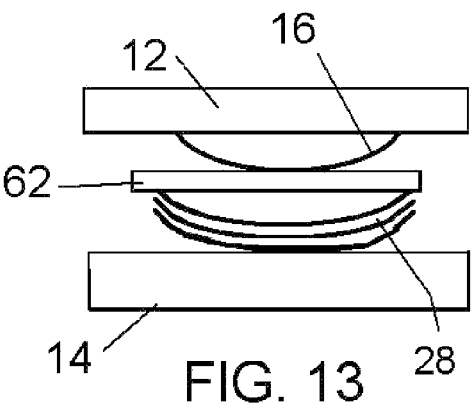
FIG. 13 is a schematic side view of a seventh embodiment of the invention.
Figure 14:
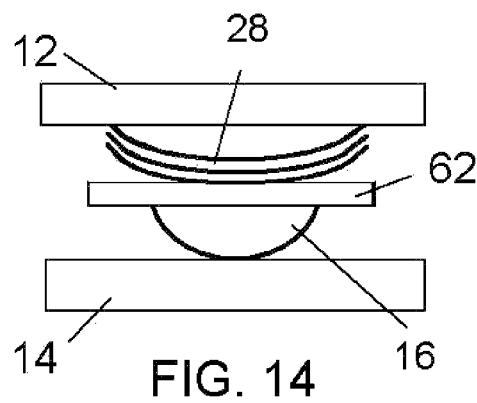
FIG. 14 is a schematic side view of an eighth embodiment of the invention.
Figure 15:
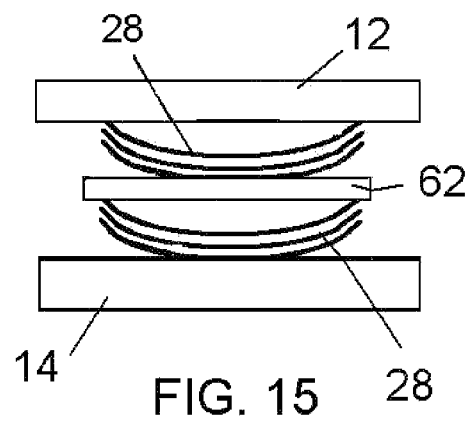
FIG. 15 is a schematic side view of a ninth embodiment of the invention.
Figure 16:
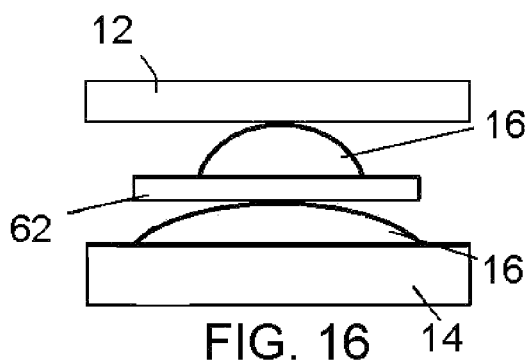
FIG. 16 is a schematic side view of a tenth embodiment of the invention.
Figure 17:
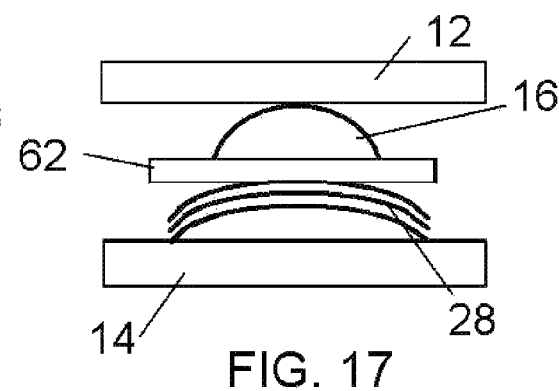
FIG. 17 is a schematic side view of an eleventh embodiment of the invention.
Figure 18:
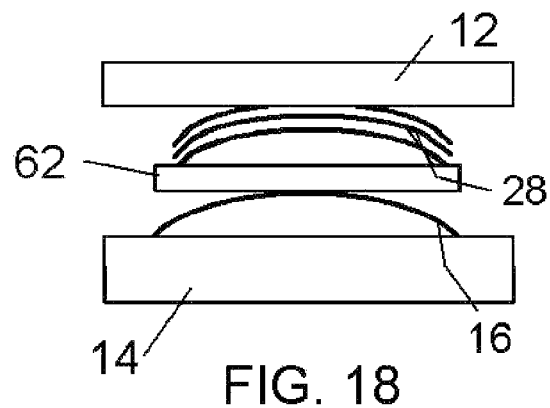
FIG. 18 is a schematic side view of a twelfth embodiment of the invention.
Figure 19:
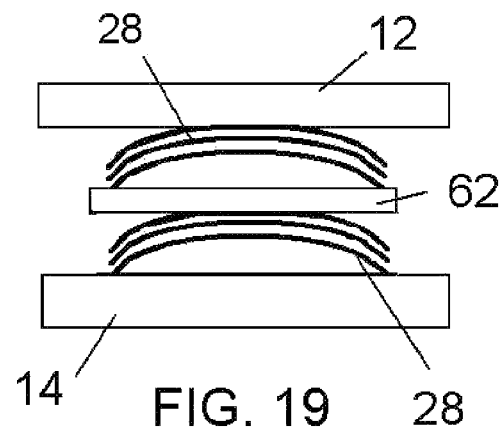
FIG. 19 is a schematic side view of a thirteenth embodiment of the invention.
Figure 20:
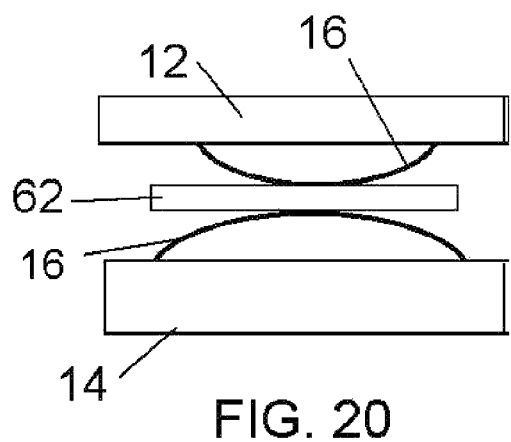
FIG. 20 is a schematic side view of a fourteenth embodiment of the invention.
Figure 21:
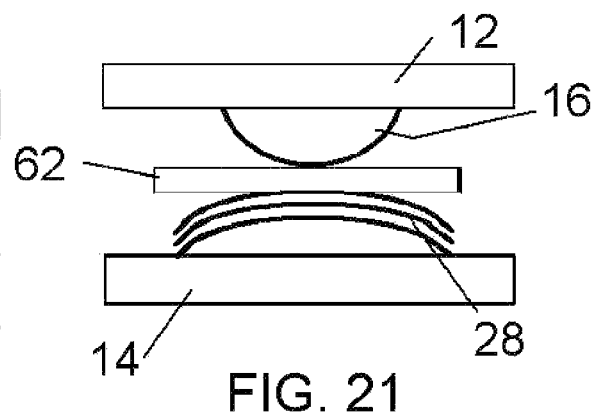
FIG. 21 is a schematic side view of a fifteenth embodiment of the invention.
Figure 22:
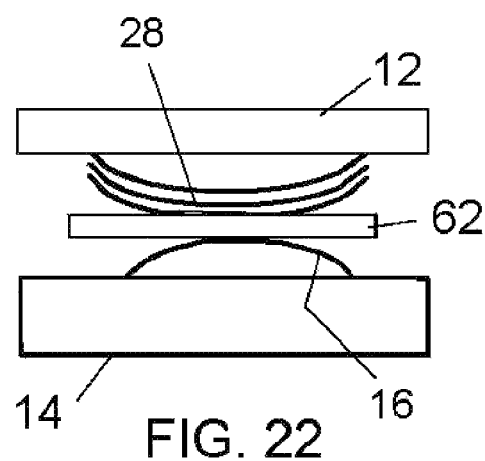
FIG. 22 is a schematic side view of a sixteenth embodiment of the invention.
Figure 23:
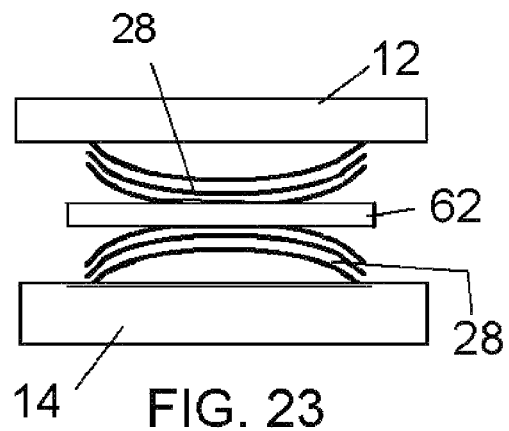
FIG. 23 is a schematic side view of a seventeenth embodiment of the invention.
Figure 24:
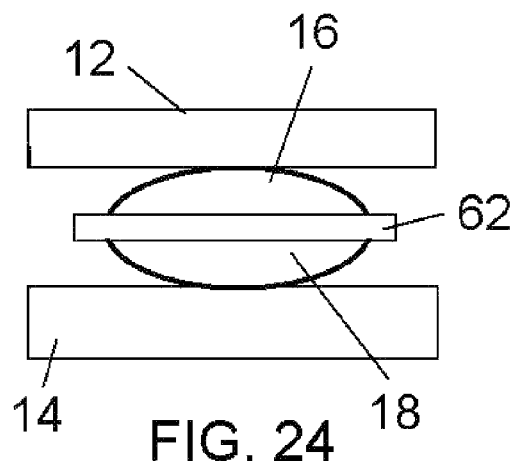
FIG. 24 is a schematic side view of an eighteenth embodiment of the invention.
Figure 25:
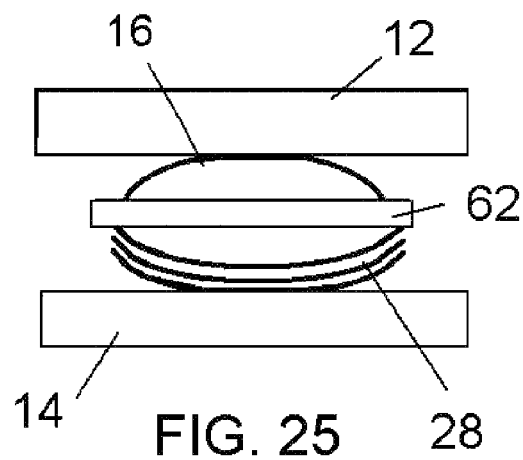
FIG. 25 is a schematic side view of a nineteenth embodiment of the invention.
Figure 26:
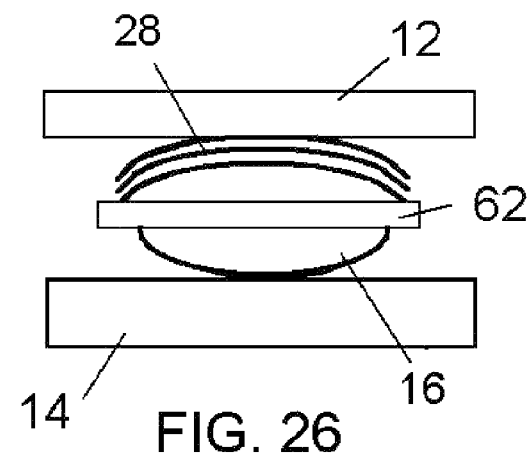
FIG. 26 is a schematic side view of a twentieth embodiment of the invention.
Figure 27:
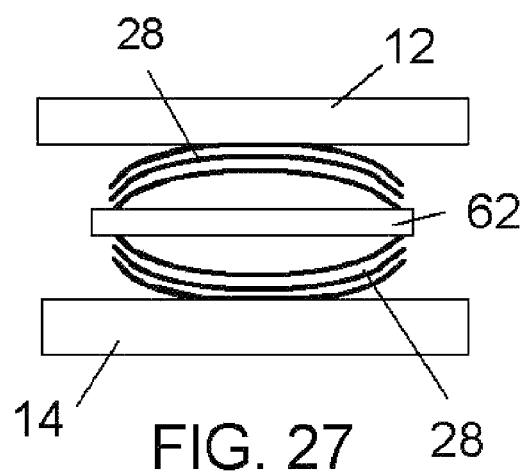
FIG. 27 is a schematic side view of a twenty-first embodiment of the invention.

A fifth embodiment of the invention is illustrated in FIGS. 10 and 11, which is very similar to the fourth embodiment except that the smaller diameter dome 56 is a separate part that nests in a recess at the apex of the large diameter dome 52 of the two-part dome 50.

Other non-limiting embodiments of the invention are shown in FIGS. 12 to 27.

In these embodiments a separator plate 62 is provided between the load transfer plate 12 and base plate 14 in each case, and in each case, between the two single domes (16 and 16), two dome stacks (28 and 28), or single dome and a dome stack (16 and 28). In this way the two domes, two dome stacks, or single dome and dome stack that provide the lower and the upper load signal, can be oriented to be both concave up as in FIGS. 12 to 15, or concave down as in FIGS. 16 to 19, or concave away from each other as in FIGS. 20 to 23 (which was also the case in FIGS. 1-4 except without the plate 62), or concave toward each other as in FIGS. 24 to 27.

While specific embodiments of the invention have been shown and described in detail to illustrate the application of the principles of the invention, it will be understood that the invention may be embodied otherwise without departing from such principles.

What is claimed:

1. A mechanical load bearing indicator for producing signals to a user when the user applies more than selected amounts of load between an extremity of the use and a surface, comprising:

a base plate adapted to establish a frame of reference with the surface;

a load plate mounted for movement toward and away from the base plate and adapted to receive loads from the user's extremity;

at least two snap domes stacked one above the other, and mechanically engaged between the base plate and the load plate for generating two signals when more than two different respective and selected loads are applied to the load plate by the extremity, the snap domes each being physically separate pieces of material from each other, each snap dome having a stable position and a snap-through unstable position; and an intermediate plate between the at least two snap domes, and when a first lower one of the loads is applied to the load plate, a first one of the snap domes collapses and when a second higher one of the loads is applied to the load plate, a second one of the snap domes also collapses;

the at least two snap stacked domes being engaged in series between the base plate, the intermediate plate and the load plate, the first one of the snap domes being of a type to collapse at the first lower one of the loads and the second one of the snap domes being of a type to collapse at the second higher one of the loads so that when the first lower one of the loads is applied to the load plate, the first one of the snap domes collapses from its stable position and snaps-through to its unstable position, and when the second higher one of the loads is applied to the load plate, the second one of the snap domes also collapses from its stable position and snaps-through to its unstable position.

2. An indicator according to claim 1, wherein each snap dome is made of spring metal.

3. An indicator according to claim 1, wherein each snap dome is made of a plastic.

4. An indicator according to claim 1, wherein the base and the load plates each have a diameter of about 3 to 5 cm, and are adapted for engagement under the user's heel or forefoot, the extremity comprising the user's foot.

5. An indicator according to claim 1, wherein the base plate with load plate and snap domes have a total height of approximately 0.6 to 1.2 cm.

6. An indicator according to claim 1, wherein at least one of the snap domes comprises a plurality of snap disks in a stack, each snap disk collapsing when an incremental load is applied to that snap disk so that at least one of the selected loads is reached by adding the incremental loads of the snap disks in the stack.

7. An indicator according to claim 1, wherein each of the snap domes comprises a plurality of snap disks in a stack, each snap disk collapsing when an incremental load is applied to that snap disk so that each of the selected loads is reached by adding the incremental loads of the snap disks in the stack.

8. An indicator according to claim 1, wherein each snap dome has a concave side with the concave side of one of the snap domes facing the intermediate plate and the concaveside of the other snap plate facing either the load plate or the base plate.

9. An indicator according to claim 1, wherein each snap dome has a concave side facing the intermediate plate.

10. An indicator according to claim 1, wherein each snap dome has a concave side facing away from the intermediate plate.

* * * * *